United States Patent
Shibagaki (10) Patent No.: US 7,150,265 B2
(45) Date of Patent: Dec. 19, 2006

(54) CONTROL APPARATUS FOR INTERNAL COMBUSTION ENGINE

(75) Inventor: Nobuyuki Shibagaki, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 11/261,651

(22) Filed: Oct. 31, 2005

(65) Prior Publication Data

US 2006/0090732 A1 May 4, 2006

(30) Foreign Application Priority Data

Nov. 2, 2004 (JP) ............ (P) 2004-319116

(51) Int. Cl.
*F02D 43/00* (2006.01)
*F02D 41/22* (2006.01)
*F02M 63/02* (2006.01)

(52) U.S. Cl. ............ 123/406.47; 123/90.15; 123/431; 123/519

(58) Field of Classification Search ............ 123/90.11, 123/90.15, 406.13, 406.47, 431, 479, 519, 123/520

See application file for complete search history.

(56) References Cited

U.S. PATENT DOCUMENTS

| 5,181,493 A | 1/1993 | Motoyama et al. |
| 5,924,405 A * | 7/1999 | Hashimoto ............ 123/431 |
| 2005/0066939 A1* | 3/2005 | Shimada ............ 123/431 |

FOREIGN PATENT DOCUMENTS

| EP | 1 505 293 A1 | 2/2005 |
| JP | A 4-31647 | 2/1992 |
| JP | A 07-293301 | 11/1995 |
| JP | A 9-287525 | 11/1997 |
| JP | A 2000-145516 | 5/2000 |
| JP | A 2000-257496 | 9/2000 |

* cited by examiner

Primary Examiner—T. M. Argenbright
(74) Attorney, Agent, or Firm—Oliff & Berridge, PLC (57) ABSTRACT

An engine ECU executes a program including the steps of: determining presence of abnormality in a low-pressure fuel system; ceasing an intake manifold injector when determination is made of abnormality in the low-pressure fuel system; increasing the target purge rate when the engine operation state attains an injection partaking state between an in-cylinder injector and an intake manifold injector; reducing the VVT overlap; and retarding the ignition timing.

16 Claims, 4 Drawing Sheets

CONTROL APPARATUS FOR INTERNAL COMBUSTION ENGINE

This nonprovisional application is based on Japanese Patent Application No. 2004-319116 filed with the Japan Patent Office on Nov. 2, 2004, the entire contents of which are hereby incorporated by reference.

BACKGROUND OF THE INVENTION

1. Field of the Invention

The present invention relates to an internal combustion engine including a first fuel injection mechanism (in-cylinder injector) for injecting fuel into a cylinder and a second fuel injection mechanism (intake manifold injector) for injecting fuel towards an intake manifold or intake port. Particularly, the present invention relates to the technique of suppressing torque variation in a state in which fuel must be injected from the first fuel injection mechanism alone in a region partaking in fuel injection.

2. Description of the Background Art

An internal combustion engine is well known, including an intake manifold injector for injecting fuel into the intake manifold of the engine and an in-cylinder injector for injecting fuel into the engine combustion chamber, wherein the fuel injection ratio of the intake manifold injector to the in-cylinder injector is determined based on the engine speed and engine load.

In the event of operation failure due to a malfunction of the in-cylinder injector or the fuel system that supplies fuel to the in-cylinder injector (hereinafter, referred to as high-pressure fuel supply system), fuel injection by the in-cylinder injector will be ceased.

On the basis of the fail-safe faculty in such operation failure, it is possible to ensure travel by inhibiting fuel injection from the in-cylinder injector and fix the combustion mode at the uniform combustion mode to effect fuel injection from the intake manifold injector alone. However, since the intake manifold injector is set to take an auxiliary role of the in-cylinder injector, fuel of a quantity corresponding to the intake air at the time of full opening of the throttle valve cannot be supplied, whereby the air-fuel ratio in the fail-safe mode will become lean. There may be the case where the torque is insufficient due to combustion defect.

Japanese Patent Laying-Open No. 2000-145516 discloses an engine controlling device that can maintain the air-fuel ratio properly to obtain suitable driving power even during fuel injection control by the intake manifold injector alone in the fail-safe mode caused by operation failure of the in-cylinder injector. This engine controlling device includes an in-cylinder injector that directly injects fuel to the combustion chamber, an intake manifold injector that injects fuel to the intake system, and an electronic control type throttle valve. When the target fuel injection quantity set based on the engine operation state exceeds a predetermined injection quantity of the in-cylinder injector, the engine controlling device compensates for the insufficient quantity by fuel injection from the intake manifold injector. This engine controlling device also includes an abnormality determination unit determining abnormality of the in-cylinder injector and the high-pressure fuel supply system that supplies fuel to the in-cylinder injector, a target fuel correction unit comparing the maximum injection quantity of the intake manifold injector when abnormality is determined with the target fuel injection quantity to fix the target fuel injection quantity at the maximum injection quantity when the target fuel injection quantity exceeds the maximum injection quantity, a target intake air quantity correction unit calculating the target intake air quantity based on the target fuel injection quantity fixed at the maximum injection quantity and the target air-fuel ratio, and a throttle opening indication value calculation unit calculating the throttle opening indication value with respect to an electronic control type throttle valve based on the target intake air quantity.

When abnormality is sensed in the in-cylinder injector and the high-pressure fuel supply system that supplies fuel to the in-cylinder injector in this engine controlling device, the maximum injection quantity of the intake manifold injector is compared with the target fuel injection quantity that is set based on the engine operation state. When the target fuel injection quantity exceeds the maximum injection quantity, the target fuel injection quantity is fixed at the maximum injection quantity. The target intake air quantity is calculated based on this fixed target fuel injection quantity and target air-fuel ratio. The throttle opening indication value is calculated with respect to the electronic control type throttle valve based on the calculated target intake air quantity. Accordingly, when abnormality is sensed in the in-cylinder injector system, fuel injection from the in-cylinder injector is inhibited, and fuel is to be injected from only the intake manifold injector. Based on the maximum injection quantity at this stage and the target air-fuel ratio, the target intake air quantity is calculated. The throttle opening indication value with respect to the electronic control type throttle valve is calculated based on the target intake air quantity. In the fail-safe mode caused by failure in the in-cylinder injector system, the throttle opening will open only to the level corresponding to the target air-fuel ratio no matter how hard the acceleration pedal is pushed down. Thus, the air-fuel ratio is maintained properly to obtain suitable driving power.

In the engine controlling device disclosed in Japanese Patent Laying-Open No. 2000-145516, fuel injection from the in-cylinder injector is ceased to inject fuel from the intake manifold injector alone when an error occurs at the high-pressure fuel supply system. However, this publication is silent about failure in the intake manifold injector and in the fuel supply system that supplies fuel to the intake manifold injector.

SUMMARY OF THE INVENTION

An object of the present invention is to provide a control apparatus for an internal combustion engine in which a first fuel injection mechanism that injects fuel into a cylinder and a second fuel injection mechanism that injects fuel to an intake manifold partake in fuel injection, maintaining proper operation of the internal combustion engine even in the event of failure at the second fuel injection mechanism side.

According to an aspect of the present invention, a control apparatus for an internal combustion engine controls the internal combustion engine that includes a first fuel injection mechanism injecting fuel into a cylinder, a second fuel injection mechanism injecting fuel into an intake manifold, a first fuel supply mechanism supplying fuel to the first fuel injection mechanism, and a second fuel supply mechanism supplying fuel to the second fuel injection mechanism. The control apparatus includes a control unit controlling the first and second fuel injection mechanisms such that the first and second fuel injection mechanisms partake in fuel injection, including a state of injection from one of the first and second fuel injection mechanisms being ceased, and an abnormality determination unit determining presence of abnormality in the second fuel supply mechanism. The control unit effects control such that, when the abnormality determination unit determines presence of abnormality in the second fuel supply mechanism, fuel injection is conducted from the first fuel injection mechanism, and not from the second fuel injection mechanism.

When determination is made of abnormality in the intake manifold injector in an internal combustion engine including a first fuel injection mechanism (in-cylinder injector) injecting fuel into a cylinder and a second fuel injection mechanism (intake manifold injector) injecting fuel into an intake manifold, fuel is injected from the in-cylinder injector, and fuel injection from the intake manifold injector is inhibited. Accordingly, in the case of abnormality such as disconnection of a harness or the like that establishes connection between the intake manifold injector and the control apparatus, a normal operation of the internal combustion engine can be maintained, based on fuel injection from the in-cylinder injector. Thus, there is provided a control apparatus for an internal combustion engine in which a first fuel injection mechanism injecting fuel into a cylinder and a second fuel injection mechanism injecting fuel into an intake manifold partake in fuel injection, maintaining a proper operation of the internal combustion engine even in the event of failure at the second fuel injection mechanism side.

Preferably, the control apparatus further includes a purge control unit controlling a purge mechanism provided at the internal combustion engine to increase the purge rate when fuel injection from the second fuel injection mechanism is not conducted as a result of determination of abnormality in the second fuel supply mechanism by the abnormality determination unit as compared to a case where determination is not made of abnormality in the second fuel supply mechanism.

In accordance with the present invention, reduction in the fuel quantity from the intake manifold injector in which abnormality is sensed is compensated for from the intake system apparently by increasing the purge rate. Accordingly, fuel can be compensated for from the intake system with a favorable mixing state of the intake air and fuel. Therefore, combustion variation can be suppressed in the case where fuel cannot be injected from the intake manifold injector.

Further preferably, the control apparatus further includes an adjustment unit adjusting a variable valve timing mechanism provided at the internal combustion engine such that overlap of intake valves and exhaust valves is reduced when fuel injection is not conducted from the second fuel injection mechanism as a result of determination of abnormality in the second fuel supply system by the abnormality determination unit as compared to a case where determination is not made of abnormality in the second fuel supply system.

In accordance with the present invention, the overlap of the intake valves and exhaust valves can be reduced to suppress intake blow-back from the combustion chamber. Accordingly, accumulation of deposits at the intake manifold injector or intake port caused by the PM (Particulate Matters) included in the blow-back can be suppressed. Since the state of no accumulation of deposits can be maintained when fuel injection from the intake manifold injector is not conducted as long as the intake manifold injector itself is absent of failure, that intake manifold injector can be .used even after, for example, repair of the harness. Further, since the combustion state is improved due to reduction in the internal EGR (Exhaust Gas Recirculation) factor when the overlap of the intake valves and exhaust valves is reduced, torque variation can be suppressed.

Further preferably, the control apparatus further includes an adjustment unit adjusting an ignition timing variable mechanism provided at the internal combustion engine such that the ignition timing is retarded when fuel injection is not conducted from the second fuel injection mechanism as a result of determination of abnormality in the second fuel supply system by the abnormality determination unit as compared to the case where determination is not made of abnormality in the second fuel supply mechanism.

In accordance with the present invention, the ignition timing is retarded and the combustion temperature is reduced to suppress generation of NOx. By retarding the ignition timing as compared to the case where the ignition timing is set in the vicinity of MBT (Minimum spark advance for Best Torque) where the combustion pressure is highest and the combustion temperature is also high, the combustion pressure and the combustion temperature are reduced, allowing suppression of NOx generation. By such reduction in combustion temperature and suppression of NOx, accumulation of deposits at the injection hole of the in-cylinder injector can be suppressed. Therefore, accumulation of deposits towards the injection hole at the leading end of the in-cylinder injector can be suppressed even in the case where fuel injection is to be conducted from only the in-cylinder injector and not from the intake manifold injector in the region where the in-cylinder injector and the intake manifold injector partake in fuel injection.

Further preferably, the control apparatus further includes an adjustment unit adjusting the variable valve timing mechanism or ignition timing variable mechanism such that the condition for deposits accumulating at the leading end of the first fuel injection mechanism in the event of not conducting fuel injection from the second fuel injection mechanism as a result of determination of abnormality in the second fuel supply mechanism by the abnormality determination unit will not become worse than the condition for deposits accumulating at the leading end of the first fuel injection mechanism in the event of the first and second fuel injection mechanisms partaking in fuel injection under the same operation condition.

In accordance with the present invention, the adjustment unit adjusts the variable valve timing mechanism or ignition timing variable mechanism. The adjustment unit adjusts these mechanisms such that the condition for deposits accumulating at the leading end of the in-cylinder injector is not worse when fuel injection is conducted from the in-cylinder injector alone than when the intake manifold injector and the in-cylinder injector partake in fuel injection. For example, the ignition timing is retarded. The ignition timing is retarded based on a favorable combustion state by reducing the valve overlap to lower the internal EGR rate. Thus, the combustion temperature is reduced and generation of NOx is suppressed. Accordingly, accumulation of deposits at the injection hole of the in-cylinder injector can be suppressed.

Further preferably, the condition includes the condition about the temperature at the leading end of the first fuel injection mechanism.

In accordance with the present invention, based on the condition for the temperature at the leading end of the in-cylinder injector (for example, the condition that the temperature at the leading end of the in-cylinder injector is substantially equal or below between the case where the intake manifold injector and in-cylinder injector partake in fuel injection and the case where fuel injection is conducted only by the in-cylinder injector), the ignition timing is retarded and the combustion temperature is reduced to suppress accumulation of deposits at the injection hole of the in-cylinder injector.

Further preferably, the control apparatus further includes an adjustment unit adjusting the variable valve timing mechanism or ignition timing variable mechanism such that the condition for deposits accumulating at the second fuel injection mechanism or a neighborhood thereof in the event of not conducting fuel injection from the second fuel injection mechanism as a result of determination of abnormality in the second fuel supply system by the abnormality determination unit will not become worse than the condition for deposits accumulating at the leading end of the second fuel injection mechanism or a neighborhood thereof in the event of the first and second fuel injection mechanisms partaking in fuel injection under the same operation condition.

In accordance with the present invention, the adjustment unit adjusts the variable valve timing mechanism or ignition timing variable mechanism. The adjustment unit adjusts the mechanism such that the condition for deposits accumulating at the leading end of the intake manifold injector or at the neighborhood thereof when fuel injection is conducted from the in-cylinder injector alone will not become worse than in the case where the intake manifold injector and in-cylinder injector partake in fuel injection. For example, the valve overlap is reduced. Further, the ignition timing is retarded based on a favorable combustion state by reducing the valve overlap and reducing the internal EGR rate. Thus, the overlap of the intake valves and exhaust valves can be reduced to suppress intake blow-back from the combustion engine. Accordingly, accumulation of deposits at the intake manifold injector or intake port caused by the PM included in the blow-back can be suppressed.

Further preferably, the first fuel injection mechanism is an in-cylinder injector, and the second fuel injection mechanism is an intake manifold injector.

In accordance with the present invention, there is provided a control apparatus for an internal combustion engine in which a in-cylinder injector identified as the first fuel injection mechanism and an intake manifold injector identified as the second fuel injection mechanism, each provided individually, partake in fuel injection, conducting fuel injection from the in-cylinder injector and obviating accumulation of deposits at the intake manifold injector and in-cylinder injector while suppressing torque variation even in the case of failure such as disconnection of the harness establishing connection between the control apparatus and the intake manifold injector.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Embodiments of the present invention will be described hereinafter with reference to the drawings. The same components have the same reference characters allotted, and their designation and function are also identical. Therefore, detailed description thereof will not be repeated.

Figure 1:
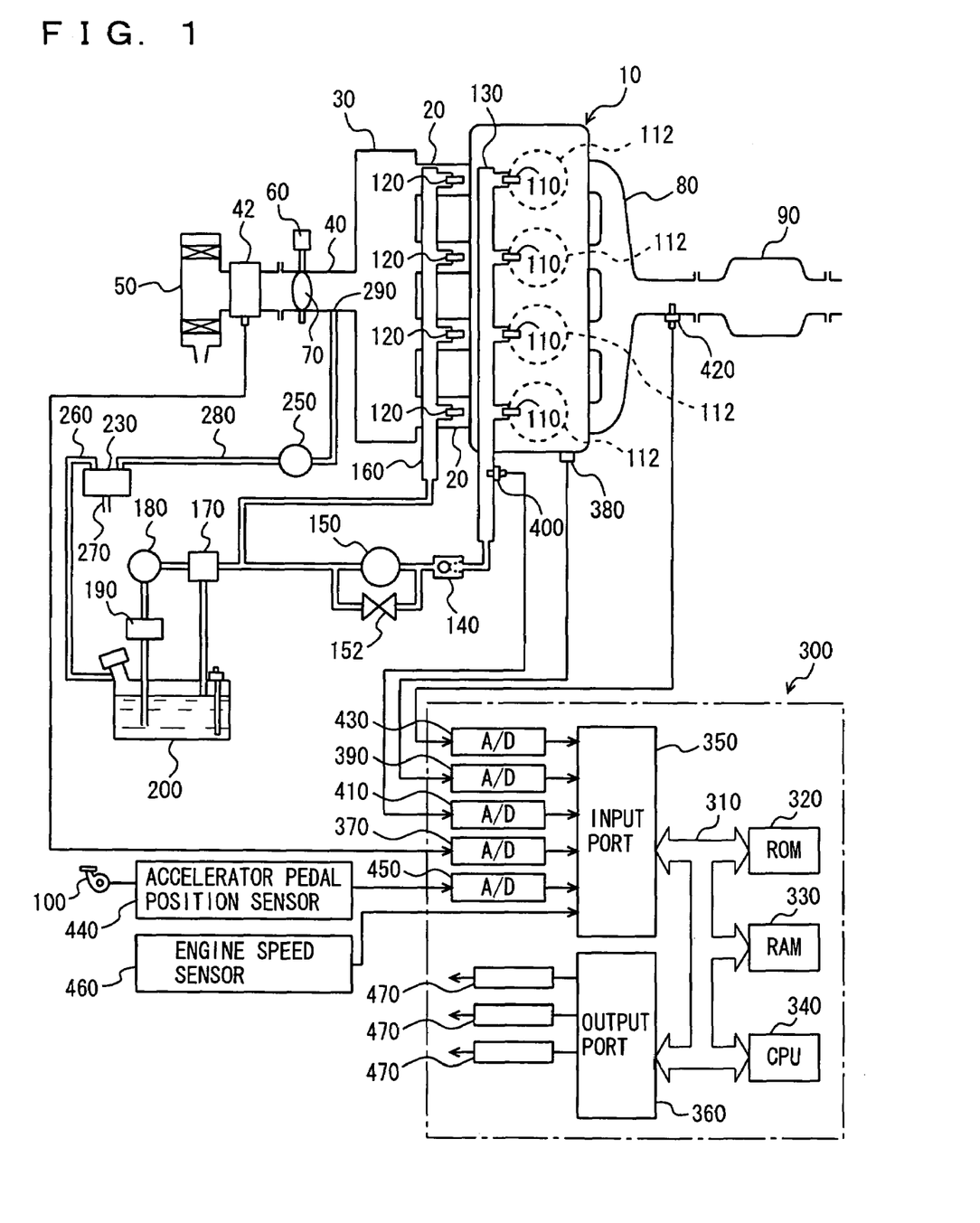
FIG. 1 is a schematic diagram showing a structure of an engine system under control of a control apparatus according to an embodiment of the present invention.

FIG. 1 is a schematic view of a structure of an engine system under control of an engine ECU (Electronic Control Unit) identified as a control apparatus for an internal combustion engine according to an embodiment of the present invention. Although an in-line 4-cylinder gasoline engine is indicated as the engine, the present invention is not limited to such an engine.

As shown in FIG. 1, the engine 10 includes four cylinders 112, each connected to a common surge tank 30 via a corresponding intake manifold 20. Surge tank 30 is connected via an intake duct 40 to an air cleaner 50. An airflow meter 42 is arranged in intake duct 40, and a throttle valve 70 driven by an electric motor 60 is also arranged in intake duct 40. Throttle valve 70 has its degree of opening controlled based on an output signal of an engine ECU 300, independently from an accelerator pedal 100. Each cylinder 112 is connected to a common exhaust manifold 80, which is connected to a three-way catalytic converter 90.

Each cylinder 112 is provided with an in-cylinder injector 110 for injecting fuel into the cylinder and an intake manifold injector 120 for injecting fuel into an intake port or/and an intake manifold. Injectors 110 and 120 are controlled based on output signals from engine ECU 300. Further, in-cylinder injector 110 of each cylinder is connected to a common fuel delivery pipe 130. Fuel delivery pipe 130 is connected to a high-pressure fuel pump 150 of an engine-driven type, via a check valve 140 that allows a flow in the direction toward fuel delivery pipe 130. Although an internal combustion engine having two injectors separately provided is explained in the present embodiment, the present invention is not restricted to such an internal combustion engine. For example, the internal combustion engine may have one injector that can effect both in-cylinder injection and intake manifold injection.

As shown in FIG. 1, the discharge side of high-pressure fuel pump 150 is connected via an electromagnetic spill valve 152 to the intake side of high-pressure fuel pump 150. As the degree of opening of electromagnetic spill valve 152 is smaller, the quantity of the fuel supplied from high-pressure fuel pump 150 into fuel delivery pipe 130 increases. When electromagnetic spill valve 152 is fully open, the fuel supply from high-pressure fuel pump 150 to fuel delivery pipe 130 is ceased. Electromagnetic spill valve 152 is controlled based on an output signal of engine ECU 300.

Specifically, the closing timing during a pressurized stroke of electromagnetic spill valve 152 provided at the pump intake side of high-pressure fuel pump 150 that applies pressure on the fuel by the vertical operation of a pump plunger through a cam attached to a cam shaft is feedback-controlled through engine ECU 300 using a fuel pressure sensor 400 provided at fuel delivery pipe 130, whereby the fuel pressure in fuel delivery pipe 130 (fuel pressure) is controlled. In other words, by controlling electromagnetic spill valve 152 through engine ECU 300, the quantity and pressure of fuel supplied from high-pressure fuel pump 150 to fuel delivery pipe 130 are controlled.

Each intake manifold injector 120 is connected to a common fuel delivery pipe 160 at the low pressure side. Fuel delivery pipe 160 and high-pressure fuel pump 150 are connected to an electromotor driven type low-pressure fuel pump 180 via a common fuel pressure regulator 170. Low-pressure fuel pump 180 is connected to fuel tank 200 via fuel filter 190. When the fuel pressure of fuel ejected from low-pressure fuel pump 180 becomes higher than a predetermined set fuel pressure, fuel pressure regulator 170 returns a portion of the fuel output from low-pressure fuel pump 180 to fuel tank 200. Accordingly, the fuel pressure supplied to intake manifold injector 120 and the fuel pressure supplied to high-pressure fuel pump 150 are prevented from becoming higher than the set fuel pressure.

Engine ECU 300 is based on a digital computer, and includes a ROM (Read Only Memory) 320, a RAM (Random Access Memory) 330, a CPU (Central Processing Unit) 340, an input port 350, and an output port 360 connected to each other via a bidirectional bus 310.

Air flow meter 42 generates an output voltage in proportion to the intake air. The output voltage from air flow meter 42 is applied to input port 350 via an A/D converter 370. A coolant temperature sensor 380 producing an output voltage in proportion to the engine coolant temperature is attached to engine 10. The output voltage from coolant temperature sensor 380 is applied to input port 350 via an A/D converter 390.

A fuel pressure sensor 400 producing an output voltage in proportion to the fuel pressure in high pressure delivery pipe 130 is attached to high pressure delivery pipe 130. The output voltage from fuel pressure sensor 400 is applied to input port 350 via an A/D converter 410. An air-fuel ratio sensor 420 producing an output voltage in proportion to the oxygen concentration in the exhaust gas is attached to exhaust manifold 80 upstream of 3-way catalytic converter 90. The output voltage from air-fuel ratio 420 is applied to input port 350 via an A/D converter 430.

Air-fuel ratio sensor 420 in the engine system of the present embodiment is a full-range air-fuel ratio sensor (linear air-fuel sensor) producing an output voltage in proportion to the air-fuel ratio of air-fuel mixture burned at engine 10. Air-fuel ratio sensor 420 may be an O₂ sensor that detects whether the air-fuel ratio of air-fuel mixture burned at engine 10 is rich or lean to the stoichiometric ratio in an on/off manner.

An accelerator pedal position sensor 440 producing an output voltage in proportion to the pedal position of an accelerator pedal 100 is attached to accelerator pedal 100. The output voltage from accelerator pedal position sensor 440 is applied to input port 350 via an A/D converter 450. A revolution speed sensor 460 generating an output pulse representing the engine speed is connected to input port 350. ROM 320 of engine ECU 300 stores the value of the fuel injection quantity set corresponding to an operation state, a correction value based on the engine coolant temperature, and the like that are mapped in advance based on the engine load factor and engine speed obtained through accelerator pedal position sensor 440 and revolution speed sensor 460 set forth above.

A canister 230 that is a vessel for trapping fuel vapor dispelled from fuel tank 200 is connected to fuel tank 200 via a paper channel 260. Canister 230 is further connected to a purge channel 280 to supply the fuel vapor trapped therein to the intake system of engine 10. Purge channel 280 communicates with a purge port 290 that opens downstream of throttle valve 70 of intake duct 40. As well known in the field of art, canister 230 is filled with an adsorbent (activated charcoal) adsorbing the fuel vapor. An air channel 270 to introduce air into canister 230 via a check valve during purging is formed in canister 230. Further, a purge control valve 250 controlling the amount of purging is provided in purge channel 280. The opening of purge control valve 250 is under duty control by engine ECU 300, whereby the amount of fuel vapor that is to be purged in canister 230, and in turn the quantity of fuel introduced into engine 10 (hereinafter, referred to as purge fuel quantity), is controlled. The purge rate can be calculated based on the purge fuel quantity. Alternatively, the purge fuel quantity is calculated from the target purge rate, and engine ECU 300 effects duty control of the opening of purge control valve 250 such that the calculated purge fuel quantity can be realized.

Figure 2:
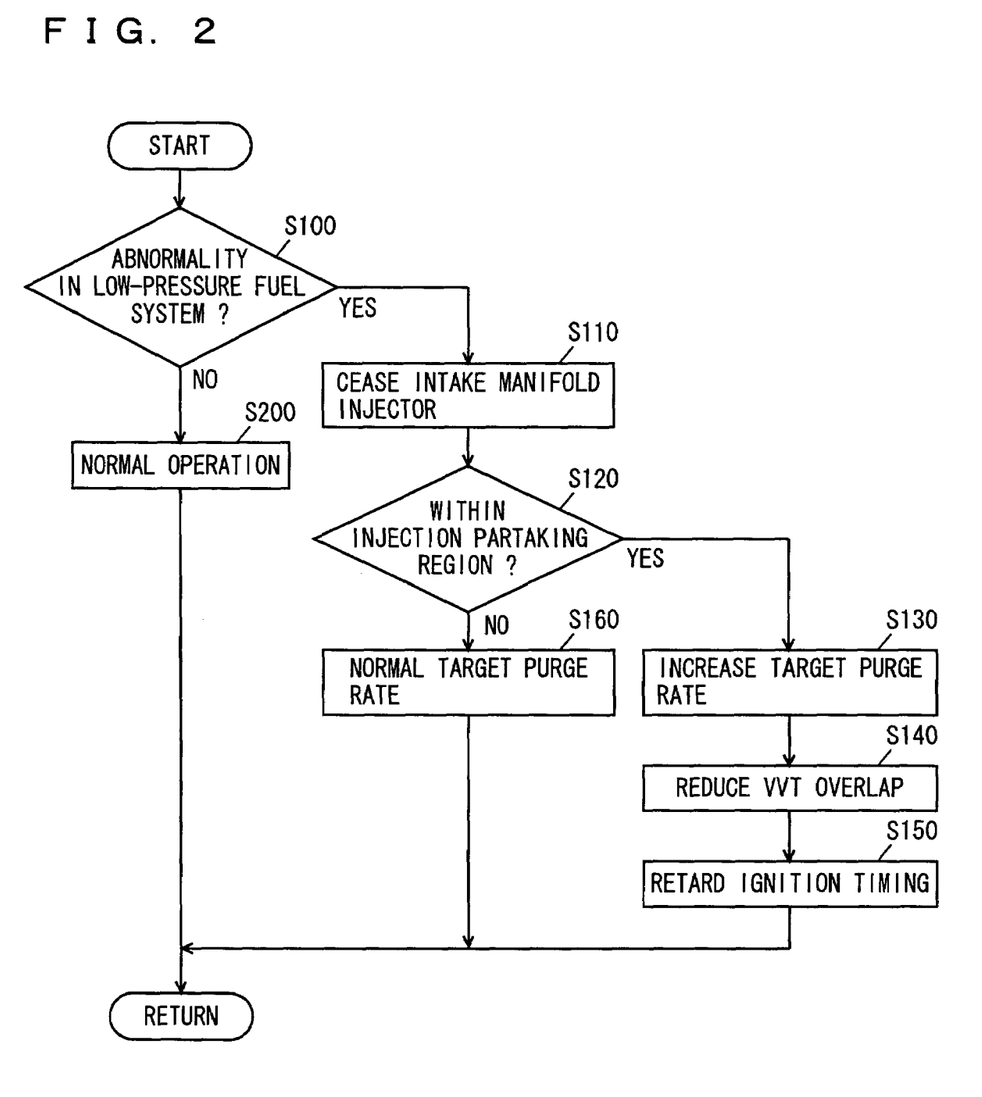
FIG. 2 is a flow chart of a control structure of a program executed by an engine ECU that is the control apparatus according to an embodiment of the present invention.

A control structure of a program executed by engine ECU 300 identified as the control apparatus of the present embodiment will be described with reference to FIG. 2. The program in this flow chart is executed at a predetermined interval of time, or at a predetermined crank angle of engine 10.

At step (hereinafter, step abbreviated as S) 100, engine ECU 300 determines whether abnormality in the low-pressure fuel system is sensed or not. For example, abnormality in the low-pressure fuel system is sensed when the harness connecting intake manifold injector 120 and engine ECU 300 is disconnected such that deviation in feedback control on the part of intake manifold injector 120 cannot be eliminated. It is to be noted that abnormality in the low-pressure fuel system does not include the inoperative state of low-pressure fuel pump 180. When abnormality in the low-pressure fuel system is sensed (YES at S100), control proceeds to S110, otherwise (NO at S100), control proceeds to S200.

At S110, engine ECU 300 inhibits fuel injection from intake manifold injector 120. At S120, engine ECU 300 determines whether the current operation state of engine 10 is within the injection partaking region between in-cylinder injector 110 and intake manifold injector 120. This determination is based on a map that will be described afterwards. When the current operation state of engine 10 is within the injection partaking region between in-cylinder injector 110 and intake manifold injector 120 (YES at S120), control proceeds to S130, otherwise (NO at S120), control proceeds to S160.

At S130, engine ECU 300 increases the target purge rate. The opening of purge control valve 250 is under duty control such that the target purge rate can be realized (to realize the purge fuel quantity corresponding to the target purge rate). Accordingly, the purge quantity is increased to compensate for the quantity of fuel injected from intake manifold injector 120. Since the fuel from the intake system is sufficiently mixed with intake air, torque variation can be suppressed in the case where fuel injection from intake manifold injector 120 is inhibited.

At S140, engine ECU 300 reduces the overlap of intake valves and exhaust valves by VVT (Variable Valve Timing). Since the overlap of intake valves and exhaust valves is reduced, the intake blow-back from the combustion chamber can be suppressed. Accordingly, accumulation of deposits at the intake manifold injector or intake port caused by the PM included in the blow-back can be suppressed. Further, since the internal EGR rate is reduced when the overlap of intake valves and exhaust valves is reduced, the combustion state becomes favorable, allowing suppression in torque variation.

At S150, engine ECU 300 retards the ignition timing. Accordingly, reduction in the combustion temperature and NOx can be realized. The temperature at the leading end of in-cylinder injector 110 can be reduced. Thus, accumulation of deposits towards the injection hole at the leading end of in-cylinder injector 110 can be suppressed.

At S160, engine ECU 300 effects duty control on the opening of purge control valve 250 such that the target purge rate can be realized in a normal manner (realize the purge fuel quantity corresponding to the target purge rate).

At S200, engine ECU 300 controls engine 10 to execute normal operation.

An operation of engine 10 under control of engine ECU 300 identified as a control apparatus for an internal combustion engine according to the present embodiment based on the structure and flow chart set forth above will be described here.

When an error occurs at the low-pressure fuel system (YES at S100), intake manifold injector 120 is ceased (S110). When the current operation state of engine 10 is within the injection partaking region between in-cylinder injector 110 and intake manifold injector 120 (YES at S120), the target purge rate is increased (S130). Since fuel from the intake system with a favorable state of intake air can be employed for compensation, torque variation reflecting combustion variation can be suppressed even in the case where fuel injection from the intake manifold injector is ceased.

Further, control is effected such that the VVT overlap amount is reduced (S140). In response to reduction in the overlap of intake valves and exhaust valves, the intake blow-back from the combustion chamber is suppressed. Therefore, accumulation of deposits at the intake manifold injector and/or intake port can be suppressed. Further, reduction in the overlap of intake valves and exhaust valves causes the internal EGR rate to be lowered, leading to a favorable combustion state. Thus, torque variation is suppressed.

Then, control is effected to retard the ignition timing (S150). By retarding the ignition timing, the combustion temperature is reduced to allow suppression of NOx. By reduction of the combustion temperature and suppression of NOx, accumulation of deposits at the injection hole of the in-cylinder injector can be suppressed.

Thus, control is effected such that the VVT overlap is reduced, and the ignition timing is retarded. Both develop synergistically the effect of suppressing accumulation of deposits at the injection hole of in-cylinder injector 110, the effect of suppressing accumulation of deposits at the injection hole of in-cylinder injector 110 and in the proximity of intake manifold injector 120, and the effect of suppressing torque variation caused by intake manifold injector 120 being ceased. This will be described specifically taking the temperature at the leading end of in-cylinder injector 110 as an example. The retarded amount of ignition timing or the overlapping amount of intake valves and exhaust valves by VVT is determined to avoid reaching the upper limit value of the temperature at the leading end corresponding to the level at which deposits will not accumulate at the injection hole of the in-cylinder injector in the case of in-cylinder injector 110 and intake manifold injector 120 partaking in fuel injection. In view of deposits at intake manifold injector 120 or in the proximity of intake manifold injector 120, the retarded amount of ignition timing or the overlapping amount of intake valves and exhaust valves is determined such that deposits are not accumulated at intake manifold injector 120 or the neighborhood thereof taking into consideration deposits that are washed away by the fuel injected from the intake manifold injector 120 in the case of in-cylinder injector 110 and intake manifold injector 120 partaking in fuel injection.

The variable valve timing mechanism or ignition timing variable mechanism is adjusted such that the condition for deposits accumulating at the leading end of in-cylinder injector 110 in the event of not conducting fuel injection from intake manifold injector 120 will not become worse than the condition for deposits accumulating at the leading end of in-cylinder injector 110 in the event of in-cylinder injector 110 and intake manifold injector 120 partaking in fuel injection under the same operation condition. Similarly, the variable valve timing mechanism or ignition timing variable mechanism is adjusted such that the condition for deposits accumulating at intake manifold injector 120 or the neighborhood thereof in the event of not conducting fuel injection from intake manifold injector 120 will not become worse than the conduction for deposits accumulating at the leading end of intake manifold injector 120 or the neighborhood thereof in the event of in-cylinder injector 110 and intake manifold injector 120 partaking in fuel injection under the same operation condition.

Thus, although the intake manifold injector is ceased when there is an error at the low-pressure fuel system, the purge amount is increased to compensate for the fuel from the intake system that has favorable mixing. The overlap of intake valves and exhaust valves by VVT is reduced to lower the blow-back. Therefore, generation of deposits caused by the PM included in the blow-back at the intake manifold injector and the neighborhood thereof can be suppressed. Further, the ignition timing is retarded to lower the combustion temperature, and generation of NOx is suppressed to obviate generation of deposits at the in-cylinder injector.

<Engine (1) to Which Present Control Apparatus can be Suitably Applied>

An engine (1) to which the control apparatus of the present embodiment is suitably adapted will be described hereinafter.

Figure 3:
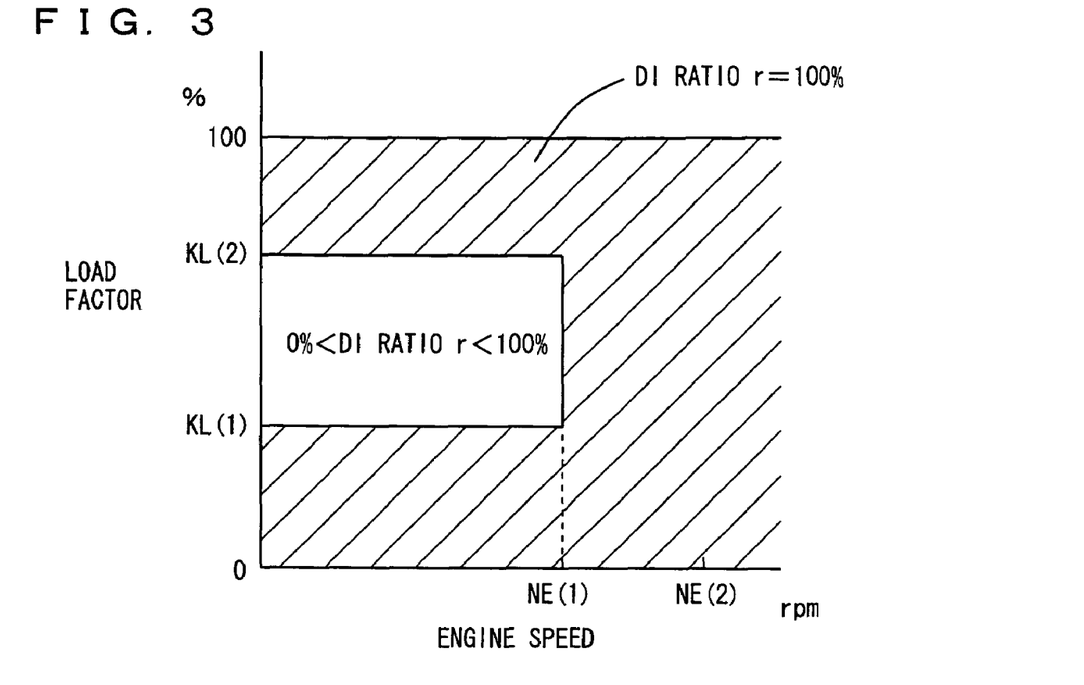
FIG. 3 represents a DI ratio map corresponding to a warm state of an engine to which the control apparatus of an embodiment of the present invention is suitably adapted.
Figure 4:
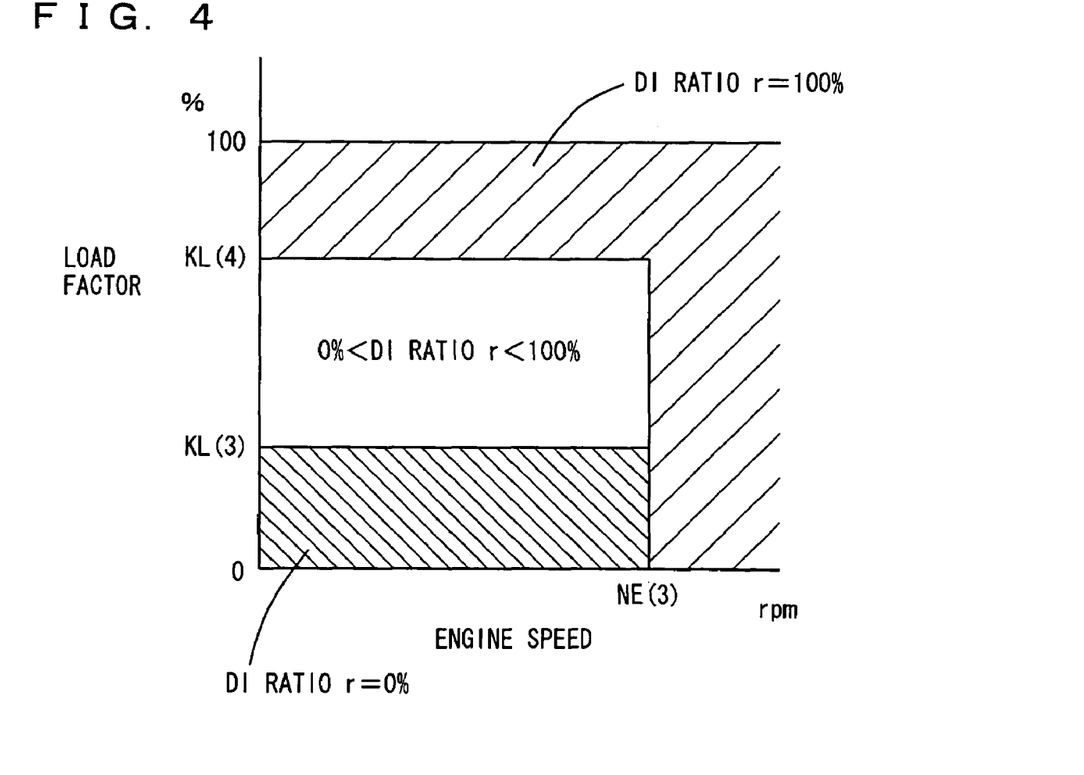
FIG. 4 represents a DI ratio map corresponding to a cold state of an engine to which the control apparatus of an embodiment of the present invention is suitably adapted.

Referring to FIGS. 3 and 4, maps indicating a fuel injection ratio (hereinafter, also referred to as DI ratio (r)) between in-cylinder injector 110 and intake manifold injector 120, identified as information associated with an operation state of engine 10, will now be described. The maps are stored in an ROM 300 of an engine ECU 300. FIG. 3 is the map for a warm state of engine 10, and FIG. 4 is the map for a cold state of engine 10.

In the maps of FIGS. 3 and 4, the fuel injection ratio of in-cylinder injector 110 is expressed in percentage as the DI ratio r, wherein the engine speed of engine 10 is plotted along the horizontal axis and the load factor is plotted along the vertical axis.

As shown in FIGS. 3 and 4, the DI ratio r is set for each operation region that is determined by the engine speed and the load factor of engine 10. "DI RATIO r=100%" represents the region where fuel injection is carried out from in-cylinder injector 110 alone, and "DI RATIO r=0%" represents the region where fuel injection is carried out from intake manifold injector 120 alone. "DI RATIO r≠0%", "DI RATIO r≠100%" and "0%<DI RATIO r<100%" each represent the region where in-cylinder injector 110 and intake manifold injector 120 partake in fuel injection. Generally, in-cylinder injector 110 contributes to an increase of power performance, whereas intake manifold injector 120 contributes to uniformity of the air-fuel mixture. These two types of injectors having different characteristics are appropriately selected depending on the engine speed and the load factor of engine 10, so that only homogeneous combustion is conducted in the normal operation state of engine 10 (for example, a catalyst warm-up state during idling is one example of an abnormal operation state).

Further, as shown in FIGS. 3 and 4, the DI ratio r of in-cylinder injector 110 and intake manifold injector 120 is defined individually in the maps for the warm state and the cold state of the engine. The maps are configured to indicate different control regions of in-cylinder injector 110 and intake manifold injector 120 as the temperature of engine 10 changes. When the temperature of engine 10 detected is equal to or higher than a predetermined temperature threshold value, the map for the warm state shown in FIG. 3 is selected; otherwise, the map for the cold state shown in FIG. 4 is selected. In-cylinder injector 110 and/or intake manifold injector 120 are controlled based on the engine speed and the load factor of engine 10 in accordance with the selected map.

The engine speed and the load factor of engine 10 set in FIGS. 3 and 4 will now be described. In FIG. 3, NE(1) is set to 2500 rpm to 2700 rpm, KL(1) is set to 30% to 50%, and KL(2) is set to 60% to 90%. In FIG. 4, NE(3) is set to 2900 rpm to 3100 rpm. That is, NE(1)<NE(3). NE(2) in FIG. 3 as well as KL(3) and KL(4) in FIG. 4 are also set appropriately.

In comparison between FIG. 3 and FIG. 4, NE(3) of the map for the cold state shown in FIG. 4 is greater than NE(1) of the map for the warm state shown in FIG. 3. This shows that, as the temperature of engine 10 becomes lower, the control region of intake manifold injector 120 is expanded to include the region of higher engine speed. That is, in the case where engine 10 is cold, deposits are unlikely to accumulate in the injection hole of in-cylinder injector 110 (even if fuel is not injected from in-cylinder injector 110). Thus, the region where fuel injection is to be carried out using intake manifold injector 120 can be expanded, whereby homogeneity is improved.

In comparison between FIG. 3 and FIG. 4, "DI RATIO r=100%" in the region where the engine speed of engine 10 is NE(1) or higher in the map for the warm state, and in the region where the engine speed is NE(3) or higher in the map for the cold state. In terms of load factor, "DI RATIO r=100%" in the region where the load factor is KL(2) or greater in the map for the warm state, and in the region where the load factor is KL(4) or greater in the map for the cold state. This means that in-cylinder injection 110 alone is used in the region of a predetermined high engine speed, and in the region of a predetermined high engine load. That is, in the high speed region or the high load region, even if fuel injection is carried out through in-cylinder injector 110 alone, the engine speed and the load of engine 10 are so high and the intake air quantity so sufficient that it is readily possible to obtain a homogeneous air-fuel mixture using only in-cylinder injector 110. In this manner, the fuel injected from in-cylinder injector 110 is atomized within the combustion chamber involving latent heat of vaporization (or, absorbing heat from the combustion chamber). Thus, the temperature of the air-fuel mixture is decreased at the compression end, so that the anti-knocking performance is improved. Further, since the temperature within the combustion chamber is decreased, intake efficiency improves, leading to high power.

In the map for the warm state in FIG. 3, fuel injection is also carried out using in-cylinder injector 110 alone when the load factor is KL(1) or less. This shows that in-cylinder injector 110 alone is used in a predetermined low-load region when the temperature of engine 10 is high. When engine 10 is in the warm state, deposits are likely to accumulate in the injection hole of in-cylinder injector 110. However, when fuel injection is carried out using in-cylinder injector 110, the temperature of the injection hole can be lowered, in which case accumulation of deposits is prevented. Further, clogging at in-cylinder injector 110 may be prevented while ensuring the minimum fuel injection quantity thereof. Thus, in-cylinder injector 110 solely is used in the relevant region.

In comparison between FIG. 3 and FIG. 4, the region of "DI RATIO r=0%" is present only in the map for the cold state of FIG. 4. This shows that fuel injection is carried out through intake manifold injector 120 alone in a predetermined low-load region (KL(3) or less) when the temperature of engine 10 is low. When engine 10 is cold and low in load and the intake air quantity is small, the fuel is less susceptible to atomization. In such a region, it is difficult to ensure favorable combustion with the fuel injection from in-cylinder injector 110. Further, particularly in the low-load and low-speed region, high power using in-cylinder injector 110 is unnecessary. Accordingly, fuel injection is carried out through intake manifold injector 120 alone, without using in-cylinder injector 110, in the relevant region.

Further, in an operation other than the normal operation, or, in the catalyst warm-up state during idling of engine 10 (an abnormal operation state), in-cylinder injector 110 is controlled such that stratified charge combustion is effected. By causing the stratified charge combustion only during the catalyst warm-up operation, warming up of the catalyst is promoted to improve exhaust emission.

<Engine (2) to Which Present Control Apparatus is Suitably Adapted>

An engine (2) to which the control apparatus of the present embodiment is suitably adapted will be described hereinafter. In the following description of the engine (2), the configurations similar to those of the engine (1) will not be repeated.

Figure 5:
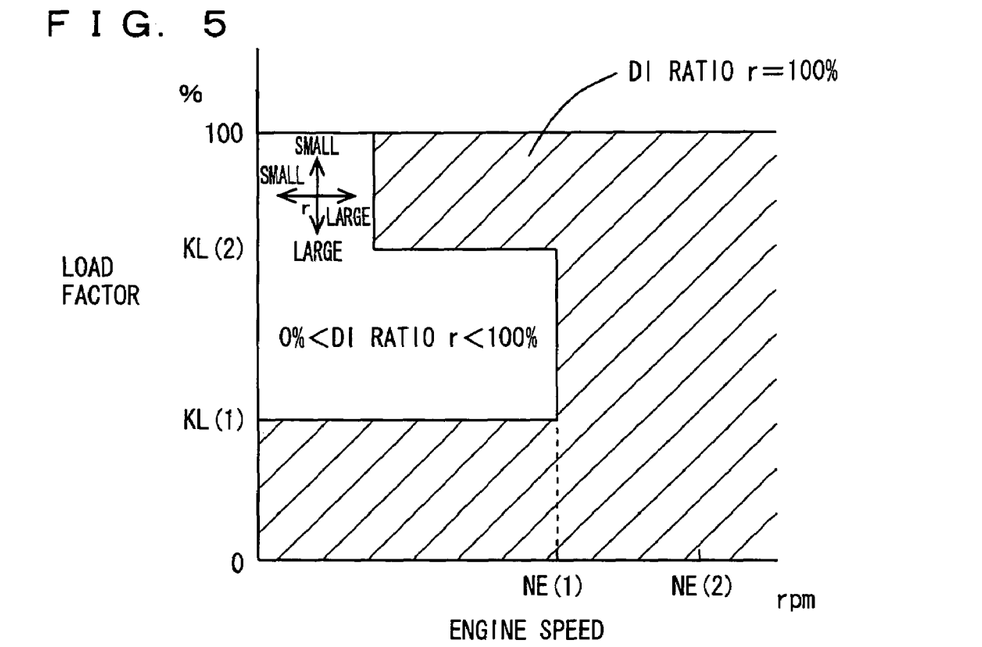
FIG. 5 represents a DI ratio map corresponding to a warm state of an engine to which the control apparatus of an embodiment of the present invention is suitably adapted.
Figure 6:
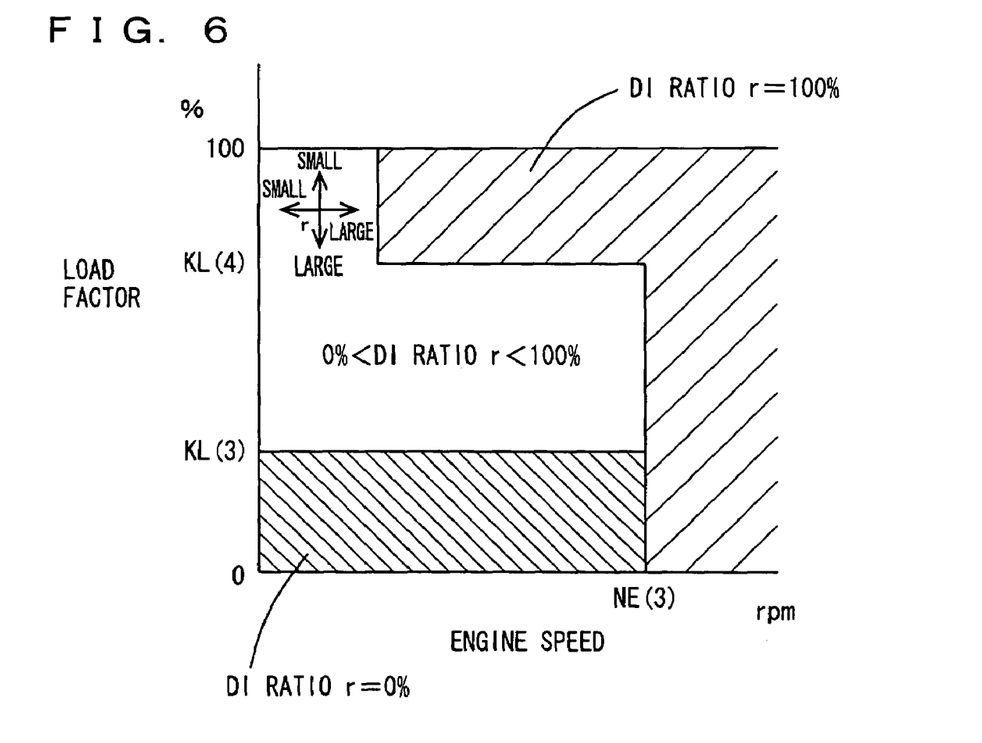
FIG. 6 represents a DI ratio map corresponding to a cold state of an engine to which the control apparatus of an embodiment of the present invention is suitably adapted.

Referring to FIGS. 5 and 6, maps indicating the fuel injection ratio between in-cylinder injector 110 and intake manifold injector 120 identified as information associated with the operation state of engine 10 will be described. The maps are stored in ROM 320 of an engine ECU 300. FIG. 5 is the map for the warm state of engine 10, and FIG. 6 is the map for the cold state of engine 10.

FIGS. 5 and 6 differ from FIGS. 3 and 4 in the following points. "DI RATIO r=100%" holds in the region where the engine speed of engine 10 is equal to or higher than NE(1) in the map for the warm state, and in the region where the engine speed is NE(3) or higher in the map for the cold state. Further, "DI RATIO r=100%" holds in the region, excluding the low-speed region, where the load factor is KL(2) or greater in the map for the warm state, and in the region, excluding the low-speed region, where the load factor is KL(4) or greater in the map for the cold state. This means that fuel injection is carried out through in-cylinder injector 110 alone in the region where the engine speed is at a predetermined high level, and that fuel injection is often carried out through in-cylinder injector 10 alone in the region where the engine load is at a predetermined high level. However, in the low-speed and high-load region, mixing of an air-fuel mixture produced by the fuel injected from in-cylinder injector 110 is poor, and such inhomogeneous air-fuel mixture within the combustion chamber may lead to unstable combustion. Thus, the fuel injection ratio of in-cylinder injector 110 is increased as the engine speed increases where such a problem is unlikely to occur, whereas the fuel injection ratio of in-cylinder injector 110 is decreased as the engine load increases where such a problem is likely to occur. These changes in the DI ratio r are shown by crisscross arrows in FIGS. 5 and 6. In this manner, variation in output torque of the engine attributable to the unstable combustion can be suppressed. It is noted that these measures are substantially equivalent to the measures to decrease the fuel injection ratio of in-cylinder injector 110 in connection with the state of the engine moving towards the predetermined low speed region, or to increase the fuel injection ratio of in-cylinder injector 110 in connection with the engine state moving towards the predetermined low load region. Further, in a region other than the region set forth above (indicated by the crisscross arrows in FIGS. 5 and 6) and where fuel injection is carried out using only in-cylinder injector 110 (on the high speed side and on the low load side), the air-fuel mixture can be readily set homogeneous even when the fuel injection is carried out using only in-cylinder injector 110. In this case, the fuel injected from in-cylinder injector 110 is atomized within the combustion chamber involving latent heat of vaporization (by absorbing heat from the combustion chamber). Accordingly, the temperature of the air-fuel mixture is decreased at the compression end, whereby the antiknock performance is improved. Further, with the decreased temperature of the combustion chamber, intake efficiency improves, leading to high power output.

In the engine described in conjunction with FIGS. 3–6, the fuel injection timing of in-cylinder injector 110 is preferably achieved in the compression stroke, as will be described hereinafter. When the fuel injection timing of in-cylinder injector 1 10 is set in the compression stroke, the air-fuel mixture is cooled by the fuel injection while the temperature in the cylinder is relatively high. Accordingly, the cooling effect is enhanced to improve the antiknock performance. Further, when the fuel injection timing of in-cylinder injector 110 is set in the compression stroke, the time required starting from fuel injection to ignition is short, which ensures strong penetration of the injected fuel. Therefore, the combustion rate is increased. The improvement in antiknock performance and the increase in combustion rate can prevent variation in combustion, and thus, combustion stability is improved.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A control apparatus for an internal combustion engine including a first fuel injection mechanism injecting fuel into a cylinder, a second fuel injection mechanism injecting fuel into an intake manifold, a first fuel supply mechanism supplying fuel to said first fuel injection mechanism, and a second fuel supply mechanism supplying fuel to said second fuel injection mechanism, said control apparatus comprising:

a control unit controlling said first and second fuel injection mechanisms such that said first and second fuel injection mechanisms partake in fuel injection, including a state of injection from one of said first and second fuel injection mechanisms being ceased, and an abnormality determination unit determining presence of abnormality in said second fuel supply mechanism, wherein said control unit effects control such that fuel is injected from said first fuel injection mechanism and not from said second fuel injection mechanisms when said abnormality determination unit determines abnormality in said second fuel supply mechanism.

2. The control apparatus according to claim 1, further comprising a purge control unit controlling a purge mechanism provided at said internal combustion engine to increase a purge rate when fuel injection is not conducted from said second fuel injection mechanism as a result of determination of abnormality in said second fuel supply system by said abnormality determination unit as compared to a case where determination is not made of abnormality in said second fuel supply mechanism.

3. The control apparatus according to claim 1, further comprising an adjustment unit adjusting a variable valve timing mechanism provided at said internal combustion engine such that overlap of intake valves and exhaust valves is reduced when fuel injection from said second fuel injection mechanism is not conducted as a result of determination of abnormality in said second fuel supply mechanism by said abnormality determination unit as compared to a case where determination is not made of abnormality in said second fuel supply mechanism.

4. The control apparatus according to claim 1, further comprising an adjustment unit adjusting an ignition timing variable mechanism provided at said internal combustion engine such that ignition timing is retarded when fuel injection is not conducted from said second fuel injection mechanism as a result of determination of abnormality in said second fuel supply mechanism by said abnormality determination unit as compared to a case where determination is not made of abnormality in said second fuel supply mechanism.

5. The control apparatus according to claim 1, further comprising an adjustment unit adjusting a variable valve timing mechanism or ignition timing variable mechanism such that a condition for deposits accumulating at a leading end of said first fuel injection mechanism when fuel injection is not conducted from said second fuel injection mechanism as a result of determination of abnormality in said second fuel supply mechanism by said abnormality determination unit will not become worse than the condition for deposits accumulating at the leading end of said first fuel injection mechanism in the event of said first fuel injection mechanism and said second fuel injection mechanism partaking in fuel injection under the same operation condition.

6. The control apparatus according to claim 5, wherein said condition includes a condition about a temperature at the leading end of said first fuel injection mechanism.

7. The control apparatus according to claim 1, further comprising an adjustment unit adjusting a variable valve timing mechanism or ignition timing variable mechanism such that a condition for deposits accumulating at said second fuel injection mechanism or at a neighborhood thereof in an event of not conducting fuel injection from said second fuel injection mechanism as a result of determination of abnormality in said second fuel supply mechanism by said abnormality determination unit will not become worse than the condition for deposits accumulating at the leading end of said second fuel injection mechanism or a neighborhood thereof in the event of said first fuel injection mechanism and said second fuel injection mechanism partaking in fuel injection under the same operation state.

8. The control apparatus according to claim 1, wherein said first fuel injection mechanism is an in-cylinder injector, and said second fuel injection mechanism is an intake manifold injector.

9. A control apparatus for an internal combustion engine including first fuel injection means for injecting fuel into a cylinder, second fuel injection means for injecting fuel into an intake manifold, first fuel supply means for supplying fuel to said first fuel injection means, and second fuel supply means for supplying fuel to said second injection means, said control apparatus comprising:
   control means for controlling said first and second fuel injection means such that said first and second fuel injection means partake in fuel injection, including a state of injection from one of said first and second fuel injection means being ceased, and
   abnormality determination means for determining presence of abnormality in said second fuel supply means,
   wherein said control means includes means for effecting control such that fuel is injected from said first fuel injection means and not from said second fuel injection means when said abnormality determination means determines abnormality in said second fuel supply means.

10. The control apparatus according to claim 9, further comprising means for controlling a purge mechanism provided at said internal combustion engine to increase a purge rate when fuel injection is not conducted from said second fuel injection means as a result of determination of abnormality in said second fuel supply system by said abnormality determination means as compared to a case where determination is not made of abnormality in said second fuel supply means.

11. The control apparatus according to claim 9, further comprising adjustment means for adjusting a variable valve timing mechanism provided at said internal combustion engine such that overlap of intake valves and exhaust valves is reduced when fuel injection from said second fuel injection means is not conducted as result of determination of abnormality in said second fuel supply means by said abnormality determination means as compared to a case where determination is not made of abnormality in said second fuel supply means.

12. The control apparatus according to claim 9, further comprising adjustment means for adjusting an ignition timing variable mechanism provided at said internal combustion engine such that ignition timing is retarded when fuel injection is not conducted from said second fuel injection means as a result of determination of abnormality in said second fuel supply means by said abnormality determination means as compared to a case where determination is not made of abnormality in said second fuel supply means.

13. The control apparatus according to claim 9, further comprising adjustment means for adjusting a variable valve timing mechanism or ignition timing variable mechanism such that a condition for deposits accumulating at a leading end of said first fuel injection means when fuel injection is not conducted from said second fuel injection means as result of determination of abnormality in said second fuel supply means by said abnormality determination means will not become worse than the condition for deposits accumulating at the leading end of said first fuel injection means in an event of said first fuel injection means and said second fuel injection means partaking in fuel injection under the same operation condition.

14. The control apparatus according to claim 13, wherein said condition includes a condition about a temperature at the leading end of said first fuel injection means.

15. The control apparatus according to claim 9, further comprising adjustment means for adjusting a variable valve timing mechanism or ignition timing variable mechanism such that a condition for deposits accumulating at said second fuel injection means or at a neighborhood thereof in an event of not conducting fuel injection from said second fuel injection means as result of determination of abnormality in said second fuel supply means by said abnormality determination means will not become worse than the condition for deposits accumulating at the leading end of said second fuel injection means or a neighborhood thereof in an event of said first fuel injection means and said second fuel injection means partaking in fuel injection under the same operation state.

16. The control apparatus according to claim 9, wherein said first fuel injection means is an in-cylinder injector, and said second fuel injection means is an intake manifold injector.

* * * * *